United States Patent [19]
Piermattie et al.

[11] Patent Number: 4,983,669
[45] Date of Patent: Jan. 8, 1991

[54] THERMOSETTING COMPOSITION FROM MALEIMIDE, OLEFINIC MONOMER AND UNSATURATED POLYESTER

[75] Inventors: Virginia Piermattie; George L. Brownell, both of Pittsburgh, Pa.

[73] Assignee: Aristech Chemical Corporation, Pittsburgh, Pa.

[21] Appl. No.: 317,321

[22] Filed: Mar. 1, 1989

Related U.S. Application Data

[63] Continuation-in-part of Ser. No. 167,674, Mar. 7, 1988, abandoned.

[51] Int. Cl.$^5$ .............................................. C08G 63/52
[52] U.S. Cl. .......................................... 525/47; 525/38
[58] Field of Search ..................................... 525/47, 38

[56] References Cited
U.S. PATENT DOCUMENTS

| | | | |
|---|---|---|---|
| 2,385,932 | 10/1945 | Muskat et al. | 260/78 |
| 2,387,933 | 10/1945 | Muskat et al. | 260/78 |
| 2,401,549 | 6/1946 | Chenicek | 260/78 |
| 2,650,125 | 8/1953 | Strain | 525/47 |
| 3,053,851 | 9/1962 | Ladd | 260/326.5 |
| 3,265,708 | 8/1966 | Stiteler | 260/326.5 |
| 3,352,832 | 11/1967 | Barr et al. | 260/78 |
| 3,426,228 | 2/1969 | Barrie et al. | 310/215 |
| 3,435,003 | 3/1969 | Craven | 260/47 |
| 3,480,598 | 11/1969 | Nield | 260/78.5 |
| 3,615,531 | 10/1971 | Meyer et al. | 96/67 |
| 3,652,726 | 3/1972 | Nield et al. | 260/876 |
| 3,666,720 | 5/1972 | Nield et al. | 260/47 |
| 3,676,404 | 7/1972 | Nield | 260/78 |
| 3,729,446 | 4/1973 | Holub et al. | 260/47 |
| 3,756,991 | 9/1973 | Kühne et al. | 260/78 |
| 3,766,142 | 10/1973 | Nield et al. | 260/47 |
| 3,998,907 | 12/1976 | DeGiulio | 260/857 |
| 4,088,710 | 5/1978 | Spak et al. | 525/47 |
| 4,111,919 | 9/1978 | Gruffaz et al. | 526/264 |
| 4,173,595 | 11/1979 | Gruffaz et al. | 525/165 |
| 4,288,583 | 9/1981 | Zahir et al. | 526/262 |
| 4,374,951 | 2/1983 | Lee et al. | 525/73 |
| 4,381,373 | 4/1983 | Ikuma | 525/194 |
| 4,485,215 | 11/1984 | Dean | 525/285 |
| 4,496,695 | 1/1985 | Sugio et al. | 525/391 |
| 4,525,536 | 6/1985 | Ikuma et al. | 525/194 |
| 4,605,700 | 8/1986 | Le-Khac | 525/73 |
| 4,632,962 | 12/1986 | Gallucci | 525/262 |
| 4,653,584 | 3/1987 | Ball et al. | 166/273 |
| 4,663,424 | 5/1987 | Stix et al. | 528/182 |
| 4,683,275 | 7/1987 | Kato et al. | 526/378 |
| 4,696,978 | 9/1987 | Dean | 525/205 |

Primary Examiner—Ana L. Carrillo
Attorney, Agent, or Firm—William L. Krayer

[57] ABSTRACT

Thermosetting compositions comprise, (a) about 10% to about 60% of a polymerizable olefinic monomer such as styrene or vinyl toluene (b) from about 1 to about 40% of a maleimide of the formula:

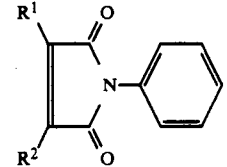

where $R^1$ and $R^2$ are independently selected from hydrogen or $C_{1-3}$ alkyl groups, and in which the phenyl group may be substituted with aliphatic, alicyclic, and aromatic groups and up to three halogen or hydroxyl groups, and (c) about 5% to about 89% unsaturated polyester.

The compositions are useful for their electrical and heat resistant properties as molding compositions, for the impregnation of electrical coils and for encasing electrical components.

9 Claims, No Drawings

THERMOSETTING COMPOSITION FROM MALEIMIDE, OLEFINIC MONOMER AND UNSATURATED POLYESTER

This is a continuation-in-part of our co-pending application Ser. No. 167,674, filed Mar. 7, 1988 (now abandoned), also entitled "Thermosetting Composition From Maleimide, Olefinic Monomer and Unsaturated Polyester".

TECHNICAL FIELD

This invention relates to unsaturated polyester resins; in particular it relates to the incorporation into otherwise more or less conventional unsaturated polyester resin formulations of a maleimide of the type further described herein, with the effect, among others, that the resulting thermosetting polymeric composition displays enhanced physical properties and is useful in high temperature environments. It is especially useful in high-temperature environments in and around electrical equipment.

BACKGROUND ART

It is known in the field that certain maleimides, which could also generally be classified as monomers in that they possess a structure of the 1,2-ethylenic type, will undergo free radical polymerization with certain other olefinic monomers. For example, N-phenylmaleimide undergoes a free radical polymerization reaction with styrene, an olefinic monomer widely used in plastics technology, to form a copolymer.

It has also been suggested that the attainment of improved structural stiffness and high thermal stability of certain polymers to which maleimides such as N-phenylmaleimides have been added is due to the inhibition of the rotation of the imide residue around the backbone of the macromolecule.

For example, N-phenylmaleimide used in acrylonitrile-butadiene-styrene systems has raised the heat distortion temperature of the resulting resin from 110° C. to 125° C. See also U.S. Pat. No. 3,676,404 for a disclosure of the use of N-phenyl maleimide with certain acrylic polymers.

U.S. Pat. No. 4,173,595 describes thermosetting compositions prepared from bismaleimide and N-vinyl pyrrolidone, which can be further modified by the addition of unsaturated polyester, that result in cured systems displaying enhanced mechanical properties. See also U.S. Pat. No. 4,376,206. However, a disadvantage of bismaleimide is that it is not as soluble in most ordinary olefinic monomers as is N-phenylmaleimide.

Copolymers of styrene and N-phenylmaleimide (NPM) are described in U.S. Pat. No. 4,374,951. Similar copolymers are discussed in U.S. Pat. No. 4,618,655, which discloses imidization of a copolymer of styrene and maleic anhydride. See also Japanese Patent Application No. 60-90960, which suggests a variety of co-monomers for N-phenylmaleimide and related compounds. Barrales-Rienda, Gonzalez de la Campa and Gonzalez Ramos, *J. Macromol. Sci. -Chem.*, A11(2), pp. 267-286 (1977) recite several copolymerizations of N-phenylmaleimide and observe improved stiffness and thermal stability. Copolymerization of N-phenylmaleimide with styrene is also shown in U.S. Pat. Nos. 4,374,951 and 4,604,438.

In the presentation of our co-pending application Ser. No. 167,674, of which this is a continuation-in-part, the examiner cited U.S. Pat. No. 2,650,215 to Strain, and particularly Example IV thereof, in which a more or less conventional unsaturated polyester composition was reacted with N-ethyl maleimide. It should be noted that Example IV does not teach anything of its results and, in fact, is inconsistent with the main teaching of the patent. The reference is concerned with esters which are made from unsaturated alcohols—the entire body of the description is restricted to the use of such esters, and the polyesters used in Example IV are not made with such unsaturated alcohols, nor is the formulation of Example IV within the claims. No Barcol hardness or heat distortion data are given as for the other examples. N-phenylmaleimide is listed under Example I as having resulted in a shortened gelation time, but only in a mixture with diethylene glycol bis (allyl carbonate). There is no teaching whatever in the Strain patent with respect to electrical or heat resistant properties of unsaturated polyesters such as are employed in the present disclosure when copolymerized with N-phenylmaleimide. The unsaturated alcohols used for Strain's teaching are referred to in the three patents cited by Strain at column 4, lines 18-19.

Various synthesis routes or schemes have been used to make the N-phenylmaleimides which we employ in polyester formulations. See, for example, M. P. Cava et al, *Organic Syntheses,* Vol. V, p. 944, U.S. Pat. Nos. 2,444,536 and 2,467,835. U.S. Pat. No. 4,376,206 relates that bismaleimides can be used to make heat-resistant thermoset resins, and cites U.S. Pat. No. 4,130,564 for a method of making maleimides and bismaleimides. A specific class of N-phenylmaleimides is disclosed in the '206 patent. See also U.S. Pat. Nos. 3,960,887, 4,111,879, 4,171,302 and particularly 4,154,737.

Our invention does not depend on a particular way of making the N-phenylmaleimide component. Any convenient method of making it will suffice.

By way of illustration, the following preparation of N-phenylmaleimide is described:

To a solution of 202 g, of maleic anhydride in 600 ml of acetone is added with agitation a solution containing 186.26 g of aniline, 33 g of triethylamine and 200 ml of acetone. After adequate reaction time, 6 g of sodium acetate and 250 g of acetic anhydride are added and the mixture is brought to reflux for about 2.5 hours. 335 g of acetone is distilled from the mixture and approximately 1000 g of water is added to the remaining reaction contents. The reaction product is filtered, washed with water and dried to give 200 g of product (86.3% yield) m.p. 86° C.

DISCLOSURE OF INVENTION

The present invention relates to new thermosetting compositions based on maleimides. In particular the new thermosetting compositions comprise from 1–40% by weight of a maleimide of the formula:

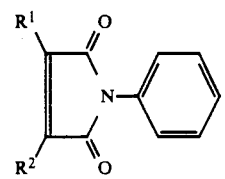

in which the phenyl group may be substituted with aliphatic, alicyclic, or aromatic groups having up to about 12 carbon atoms and up to three halogens or hydroxyl groups, and $R_1$ and $R_2$ are independently selected from hydrogen or $C_{1-3}$ alkyl.

The composition also contains about 5% by weight to about 89% by weight of an unsaturated polyester, which is a well known class of compositions. They are prepared by polycondensation of polycarboxylic acid derivatives, one of which must be an alpha, beta-ethylenically unsaturated polycarboxylic acid, and polyols. By polycarboxylic acid derivatives we mean to include polycarboxylic acids, their esters of lower alcohols, their acid chlorides and their anhydrides.

The ratio of polycarboxylic acid to polyol is usually a 1:1 molar ratio. However, in most esterification processes, a slight excess of polyol is utilized to compensate for polyol losses during esterification. Also, although dicarboxylic acids and diols are most frequently utilized and the 1:1 molar ratio is prevalent, the utilization of triols and the like requires the ratio of acid to polyol to be stated more precisely as one equivalent of acid per equivalent of polyol.

The unsaturated polyesters useful in this invention may be prepared from an acid mixture wherein the unsaturated polycarboxylic acid comprises as little as 20 mole percent of the total acids present, although it is generally preferred that the unsaturated polycarboxylic acid comprise about 30 percent or more of the total acid content.

Some of the unsaturated polycarboxylic acids useful in preparing unsaturated polyesters used in this invention include:

| | |
|---|---|
| Maleic acid | Citraconic acid |
| Fumaric acid | Glutaconic acid |
| Itaconic acid | Chloromaleic acid |
| Mesaconic acid | | and the like, wherein the term "acid" is used to include the corresponding anhydrides where such anhydrides exist.

Some of the saturated and aromatically unsaturated polycarboxylic acids optionally useful in preparing unsaturated polyesters used in this invention include:

| | |
|---|---|
| Phthalic acid | Isophathalic acid |
| Tetrahydrophthalic acid | Hexahydrophthalic acid |
| Endomethylene tetrahydrophthalic acid | |
| Tetrachlorophthalic acid | Glutaric acid |
| Hexachloroendomethylene | tetrahydrophthalic acid |
| Succinic acid | Suberic acid |
| Adipic acid | Sebacic acid | and the like, where in the term "acid" includes the corresponding anhyrides where such anhydrides exist. The $>C=C<$ groups of the aromatic unsaturated polycarboxylic acids are relatively unreactive and do not participate to any substantial degree in polymerization reactions occurring between the unsaturation group of the polyester, as provided by the alpha, beta-ethylenically unsaturated acid present, such as maleic acid, and the ethylenically unsaturated monomer, such as styrene as described elsewhere herein.

Polyols useful in preparing polyesters for use in this invention are polyfunctional alcohols of the type conventionally utilized in polyester preparation. Such polyols include:

| | |
|---|---|
| Ethylene glycol | 1,5 propanediol |

| | |
|---|---|
| Propylene glycol | Triethylene glycol |
| Butylene glycol | Glycerol |
| Diethylene glycol | 1,4,6-hexanetriol |
| Trimethylolpropane | Trimethylolethane |
| Dipropylene glycol | Pentaerythritol |
| Neopentyl glycol | |
| 2,2-bis(4-hydroxyphenyl)propane | | and the like. Although diols are generally preferred in the preparation of unsaturated polyesters, the more functional polyols, i.e., polyols having a functionality of about four, are frequently used.

Our new composition may also contain from about 10% by weight to about 60% by weight of a polymerizable olefinic-type monomer. Unsaturated polyesters are commonly used in the form of solutions in such monomers. Olefinic monomers may be, for example, vinyl substituted mononuclear aromatic hydrocarbons and halo and alkyl derivatives thereof, alkyl esters of alpha, beta-ethylenically unsaturated monocarboxylic acids and halo derivatives thereof, and allyl esters and ethers, the following compounds being illustrative:

| | |
|---|---|
| Styrene | Vinyl toluene |
| Alpha-methyl styrene | Divinyl benzene |
| Para-methyl styrene | |
| Methyl methacrylate | Dichlorostyrene |
| Diallyl phthalate | Triallyl cyanurate |
| Diester of phthalic acid and the diallyl ether of trimethylol propane | | and the like.

It is further understood that the total sum of the weight percentages of each component N-phenylmaleimide, unsaturated polyester and olefinic monomer must be 100%.

Formulations containing the desired amounts of specified components can be prepared by producing an intimate mixture of the constituents. It is possible to produce a solution of the maleimide and unsaturated polyester in olefinic monomer, if necessary while heating so as to facilitate the formation of an homogeneous liquid composition.

The liquid composition can be used as is whereupon it is subsequently cured by heating and if appropriate with the use of a catalyst such as a peroxide. Typical polymerization catalysts for initiating and catalyzing polymerization between an unsaturated polyester and an unsaturated monomer used in preparing polyester resins useful in this invention include:

| | |
|---|---|
| Benzoyl peroxide | Lauroyl peroxide |
| 2,4-dichlorobenzoyl peroxide | |
| Caprylyl peroxide | Acetyl peroxide |
| Methyl ethyl ketone peroxide | |
| Cumene hydroperoxide | t-Butyl hydroperoxide |
| Di-t-butyl peroxide | | and the like.

Our composition is useful for the manufacture of molded articles, for the impregnation of electrical coils, and for encasing electrical components.

BEST MODE FOR CARRYING OUT THE INVENTION

While, as suggested above, our composition may comprise about 1–40% N-phenylmaleimide of the type described, about 5-89% unsaturated polyester, and about 10% to about 60% styrene or similar polymerizable ethylenically unsaturated monomer, we prefer to use a composition wherein the N-phenylmaleimide is present in an amount from about 5% to about 20% of the overall composition, the polyester is present in about 40 to about 80% of the overall composition, and in which the polymerizable monomer is vinyl toluene (or styrene) and comprises about 10% to about 40% of the overall composition.

EXAMPLE I

A 500 g solution composed of 30% by weight vinyl toluene and 70% of unsaturated resin was prepared. The unsaturated polyester resin was made from maleic anhydride, isophthalic acid, neopentyl glycol and Esterdiol-204 (Union Carbide 2,2-dimethyl-3-hydroxypropyl-2,2-dimethyl-3-hydroxypropionate). The weight ratio maleic anhydride/isophthalic was 70/30 and the weight ratio neopentyl glycol/Esterdiol-204 was 5/95. The molecular weight of this polyester was about 6000. The viscosity of the solution thinned with the vinyl toluene was 1175 cp. SPI (benzoyl peroxide paste 82.5° C.) gel was 4 minutes; interval 2.5 minutes and peak temperature 188° C. To this solution was intimately mixed 55 g of N-phenylmaleimide. The viscosity of the resulting formulation was 1375 cp and SPI (benzoyl peroxide paste 82.5° C.) gel was 1.5 minutes; interval 1 minute and peak temperature 196° C.

This resin formulation was incorporated into a glass-filled laminate and subjected to dielectric strength testing according to ASTM D149 (incorporated herein by reference) during a heat-aging cycle at 255° C. The laminate displayed approximately a 130-hour increase in heat stability for dielectric strength as compared to a similar formulation containing no N-phenylmaleimide, that is, in accordance with the test procedure, the time required in the heat-aging cycle to reach 50% of its original dielectric strength was increased by 130 hours.

EXAMPLE II

A 1500 g solution composed of 30% by weight vinyl toluene and 70% of unsaturated resin was prepared. The unsaturated polyester resin was made from a major amount of isophthalic acid, adipic acid, maleic anhydride, and, as the glycol, diethylene glycol. The molecular weight of this polyester was about 4800. The polydispersity was 1.86. The viscosity of the thinned solution was 1150 cp. SPI (Lupersol 256 82.5° C.) gel was 5.24 minutes; interval 8.27 minutes and peak temperature 145° C. To this solution was intimately mixed 165 g of N-phenylmaleimide. The viscosity of the resulting formulation was 1210 cp, and the SPI (Lupersol 256, 82.5° C.) gel was 1.22 minutes; interval 2.18 minutes and peak temperature is 164° C.

Physical properties measured on unreinforced castings of this formulation are compared to those of a similar formulation that contains no N-phenylmaleimide.

|  | Example II | Formualtion without N-phenylmaleimide |
|---|---|---|
| Flex Modulus, psi | 69,500 | 17,700 |
| Tensile Strength, psi | 2321 | 1479 |
| Tensile Modulus, psi | 48,400 | 14,000 |

-continued

|  | Example II | Formualtion without N-phenylmaleimide |
|---|---|---|
| Elongation, Break, psi | 59.1 | 54.7 |

This resin formulation was also incorporated into a glass-filled laminate and subjected to dielectric strength testing according to ASTM D 149 during a heat-aging cycle at 255° C. The lamiante displayed approximately a 325-hour increase in heat stability for dielectric strength as compared to a similar formulation containing no N-phenylmaleimide.

EXAMPLE III

A solution composed of 30% by weight vinyl toluene and 70% of unsaturated polyester resin was prepared. The polyester resin was made from maleic anhydride, isophthalic acid, neopentyl glycol and 2,2-dimethyl-3-hydroxypropyl-2,2-dimethyl-3-hydroxypropionate. The weight ratio of maleic anhydride/isophthalic acid was 92/8 and the weight ratio neopentyl glycol/2,2-dimethyl-3-hydroxypropyl-2,2-dimethyl-3-hydroxypropionate was 3.6/96.4. The molecular weight of this polyester was about 8800. The viscosity of the solution thinned with the vinyl tolune was 2675 cp. SPI (benzoyl peroxide paste, 82.5° C.) gel is 11.8 minutes; interval 2.66 minutes and peak temperature 170° C. To this solution was added enough N-phenylmaleimide to give a resulting formulation of composition 68% polyester resin, 29% vinyl toluene and 3% N-phenylmaleimide. SPI (benzoyl peroxide paste, 82.5° C.) gel was 6.5 minutes; interval 2.5 minutes and peak temperature 170° C.

EXAMPLE IV

A solution composed of 31.5-34.5% by weight styrene and 68.5-65.5% by weight unsaturated polyester resin was prepared. The unsaturated polyester resin was made from maleic anhydride, isophthalic acid and diethylene gylcol. The viscosity of the solution was 1400-1600 cp. The acid number ranged between 20-25. SPI (50% benzoyl peroxide paste, 82.5° C.) gel was 6-7 minutes; interval 1.5-2.5 minutes and peak temperature was 196°-218° C. Physical properties measured on a ⅛" clear casting are listed on Table A.

EXAMPLE V

To the solution described in Example IV was added enough N-phenylmaleimide to produce a formulation which contained a final concentration of 10% by weight. SPI gel was 2.6 minutes, interval 3.5 minutes and peak temperature was 226° C. Physical properties measured on a ⅛" clear casting are listed on Table A.

EXAMPLE VI

A solution composed of 41-43% by weight styrene and 59-57% by weight unsaturated polyester resin was formulated. The unsaturated polyester resin was prepared with maleic anhydride, isophthalic acid and propylene gylcol. The viscosity of the solution was 600-700 cp. Acid number ranged from 3-10. SPI gel (50% benzoyl peroxide paste, 82.5° C.) was 5-7 minutes; interval 2-3 minutes and peak temperature was 212.8°-235° C. Physical properties measured on a ⅛" clear casting are listed on Table A.

EXAMPLE VII

The unsaturated polyester resin solution from Example VI was taken and mixed with N-phenylmaleimide in the amount of 10% by weight. Physical properties were measured on a ⅛" clear casting and listed on Table A.

EXAMPLE VIII

A solution composed of 36.5–38.5% by weight styrene and 63–61.5% by weight unsaturated polyester resin was prepared. The unsaturated polyester resin was made from phthalic anhydride, maleic anhydride, propylene gylcol and diethylene glycol. The viscosity of the solution was 450–510 cp. The acid number ranged from 18–22. SPI gel was 4.5–5 minutes; interval 2–3 minutes and peak temperature was 187°–204° C. Physical properties measured on a ⅛" clear casting are listed on Table B.

EXAMPLE IX

To the solution described in Example XIII was added enough N-phenylmaleimide to produce a formulation which contained a final concentration of 10% by weight. Physical properties measured on a ⅛" clear casting are listed on Table B.

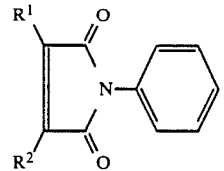

TABLE A

| | BREAK STRENGTH PSI | ELONGATION % | TENSILE MODULUS PSI | FLEX MODULUS PSI | FLEX STRENGTH PSI | DTUL* °C. |
|---|---|---|---|---|---|---|
| Ex. IV | 11384 | 4.81 | $5.03 \times 10^5$ | $4.86 \times 10^5$ | — | 58.3 |
| Ex. V | 10157 | 3.49 | $4.85 \times 10^5$ | $5.07 \times 10^5$ | — | 65 |
| Ex. VI | 5116 | 0.96 | $5.62 \times 10^5$ | $5.42 \times 10^5$ | 16597 | 106.8 |
| Ex. VII | 5833 | 1.06 | $5.83 \times 10^5$ | $5.74 \times 10^5$ | 13813 | 111.1 |

TABLE B

| | BREAK STRENGTH PSI | ELONGATION % | TENSILE MODULUS PSI | FLEX MODULUS PSI | FLEX STRENGTH PSI | DTUL °C. | IZOD IMPACT FR-16 | Tg °C. |
|---|---|---|---|---|---|---|---|---|
| Ex. VIII | 11877 | 2.27 | $5.78 \times 10^5$ | $6.42 \times 10^5$ | 14258 | 67.2 | 0.45 | 69 |
| Ex. IX | 8684 | 1.44 | $6.25 \times 10^5$ | $5.88 \times 10^5$ | 14283 | 77.2 | 0.52 | 81 |

*Distortion temperature under load, according to ASTM procedure D648, incorporated herein by reference.

We claim:

1. A thermosetting composition comprising (a) about 10 to about 60 percent by weight of a polymerizable ethylenically unsaturated monomer selected from vinyl substituted mononuclear aromatic hydrocarbons and halo and alkyl derivatives thereof, alkyl esters of alpha, beta-ethylenically unsaturated monocarboxylic acids and halo derivatives thereof, and allyl esters and ethers, (b) about 1 to about 40 percent by weight of where $R^1$ and $R^2$ are independently selected from hydrogen or $C_{1-3}$ alkyl groups, and in which the phenyl group may be substituted with aliphatic, alicyclic, and aromatic groups and up to three halogen or hydroxyl groups, and (c) about 5% to about 89% by weight unsaturated polyester prepared by polycondensation of polycarboxylic acid derivatives, one of which must be an alpha, beta-ethylenically unsaturated polycarboxylic acid, and polyols.

2. A composition of claim 1 wherein the polymerizable olefinic monomer comprises vinyl toluene.

3. A composition of claim 1 wherein the polymerizable olefinic monomer comprises styrene.

4. A composition of claim 1 wherein (b) is N-phenylmaleimide.

5. A thermosetting composition comprising, by weight,
(a) about 10% to about 40% vinyl toluene,
(b) about 1% to about 20% N-phenyl-maleimide, and
(c) about 40% to about 89% of an unsaturated polyester resin.

6. A cured composition of claim 5 having an improved heat distortion temperature under load as compared to a similar composition not containing N-phenylmaleimide.

7. A thermosetting composition comprising, by weight, (a) about 10% to about 40% styrene (b) about 1% to about 20% N-phenylmaleimide (c) about 40% to about 89% of an unsaturated polyester resin.

8. A cured composition of claim 7 having an improved heat distortion temperature under load compared to a similar composition without N-phenylmaleimide.

9. A cured composition of claim 7 having improved dielectric strength stability compared to a similar composition without N-phenylmaleimide.

* * * * *